US009689669B2

(12) United States Patent
Ross, Jr. et al.

(10) Patent No.: US 9,689,669 B2
(45) Date of Patent: Jun. 27, 2017

(54) IMAGE PLANE SENSOR ALIGNMENT SYSTEM AND METHOD

(71) Applicant: RAYTHEON COMPANY, Waltham, MA (US)

(72) Inventors: Thomas William Ross, Jr., McKinney, TX (US); Steven A. Miles, Plano, TX (US); David C. Mann, Frisco, TX (US); Marco A. Avila, McKinney, TX (US); David Russell McDonald, Plano, TX (US); Jeffery M. Gallagher, Princeton, TX (US)

(73) Assignee: RAYTHEON COMPANY, Waltham, MA (US)

( * ) Notice: Subject to any disclaimer, the term of this patent is extended or adjusted under 35 U.S.C. 154(b) by 283 days.

(21) Appl. No.: 14/685,921

(22) Filed: Apr. 14, 2015

(65) Prior Publication Data
US 2016/0305774 A1    Oct. 20, 2016

(51) Int. Cl.
*G01B 11/27* (2006.01)
*G02B 27/36* (2006.01)
(Continued)

(52) U.S. Cl.
CPC .......... *G01B 11/272* (2013.01); *G01J 1/0266* (2013.01); *G01J 1/0411* (2013.01);
(Continued)

(58) Field of Classification Search
CPC ....... G01B 11/26; G01B 11/27; G01B 11/272; G01J 1/0266; G01J 1/0411; G01J 1/4228;
(Continued)

(56) References Cited

U.S. PATENT DOCUMENTS 2,171,571 A    9/1939  Karnes
2,800,718 A *  7/1957  Benford ................. G02B 27/32
                                               359/422
(Continued)

FOREIGN PATENT DOCUMENTS

WO    9741460 A2    11/1997

OTHER PUBLICATIONS

International Search Report and Written Opinion for PCT/US2016/017567 mailed Jun. 20, 2016.

*Primary Examiner* — Gordon J Stock, Jr.
(74) *Attorney, Agent, or Firm* — Lando & Anastasi, LLP

(57) ABSTRACT

System and method for sensor alignment. In one example, a reimaging optical system includes reimaging foreoptics positioned to receive and reimage incident electromagnetic radiation to produce an intermediate image plane and output an optical beam of the received incident electromagnetic radiation, an imaging optical apparatus positioned to receive the optical beam and focus the electromagnetic radiation of the optical beam onto a first focal plane, a first imaging sensor positioned at the first focal plane and configured to produce a first image responsive to receiving the electromagnetic radiation of the optical beam, an alignment object selectively positioned at the intermediate image plane and configured to superimpose an alignment tool upon the first image, and a controller coupled to the first imaging sensor and configured to perform an alignment process for the first imaging sensor based on at least a position of the alignment tool in the first image.

26 Claims, 9 Drawing Sheets

(51) Int. Cl.
*G02B 27/34* (2006.01)
*H04N 5/232* (2006.01)
*G02B 7/28* (2006.01)
*G01J 5/08* (2006.01)
*G01J 3/02* (2006.01)
*G01J 1/42* (2006.01)
*G01J 1/04* (2006.01)
*G01J 1/02* (2006.01)
*H04N 17/00* (2006.01)
*H04N 5/225* (2006.01)

(52) U.S. Cl.
CPC ........... *G01J 1/4228* (2013.01); *G01J 3/0208* (2013.01); *G01J 3/0237* (2013.01); *G01J 3/0286* (2013.01); *G01J 3/0289* (2013.01); *G01J 5/0806* (2013.01); *G01J 5/089* (2013.01); *G02B 7/287* (2013.01); *G02B 27/34* (2013.01); *G02B 27/36* (2013.01); *H04N 5/23212* (2013.01); *H04N 17/002* (2013.01); *H04N 5/2258* (2013.01)

(58) Field of Classification Search
CPC ...... G01J 1/0422; G01J 1/0448; G01J 1/0466; G01J 3/0208; G01J 3/0237; G01J 3/0286; G01J 3/0289; G01J 3/0216; G01J 3/0248; G01J 5/0815; G01J 5/084; G01J 5/0859; G01J 5/0806; G01J 5/089; H04N 17/002; H04N 5/2258; H04N 5/23212; G02B 7/003; G02B 7/004; G02B 7/005; G02B 7/04; G02B 7/06; G02B 7/08; G02B 7/09; G02B 7/28; G02B 7/282; G02B 7/285; G02B 7/287; G02B 7/30; G02B 7/305; G02B 7/32; G02B 7/34; G02B 7/343; G02B 7/346; G02B 7/36; G02B 7/365; G02B 7/38; G02B 7/028; G02B 7/181; G02B 7/1822; G02B 7/1824; G02B 7/1827; G02B 27/64; G02B 27/68; G02B 27/32; G02B 27/34; G02B 27/36; G02B 27/40; G02B 27/644; G02B 27/646; G02B 27/648; G02B 27/30; G02B 27/0018; G02B 23/00; G02B 23/06; G02B 23/10; G02B 23/105; G02B 23/243; G02B 23/04; G03B 13/00; G03B 13/02; G03B 13/04; G03B 13/06; G03B 13/08; G03B 13/16; G03B 13/18; G03B 13/20; G03B 13/24; G03B 13/26; G03B 13/28; G03B 13/32; G03B 13/34; G03B 13/36

See application file for complete search history.

(56) References Cited

U.S. PATENT DOCUMENTS

| | | | | |
|---|---|---|---|---|
| 3,371,212 | A | * 2/1968 | Weiss | G02B 23/12 250/347 |
| 3,614,238 | A | * 10/1971 | Stites | E06B 9/80 356/124 |
| 4,080,623 | A | 3/1978 | Needs | |
| 4,238,157 | A | * 12/1980 | Strauch | G02B 27/40 250/237 R |
| 4,308,551 | A | 12/1981 | Ohnuma et al. | |
| 4,422,758 | A | 12/1983 | Godfrey et al. | |
| 4,811,061 | A | 3/1989 | Sud et al. | |
| 4,855,777 | A | * 8/1989 | Suda | G02B 7/34 396/121 |
| 4,902,128 | A | 2/1990 | Siebecker et al. | |
| 5,315,341 | A | * 5/1994 | Hibbard | G02B 7/34 396/61 |
| 5,900,942 | A | 5/1999 | Spiering | |
| 6,211,951 | B1 | 4/2001 | Guch, Jr. | |
| 6,239,912 | B1 | * 5/2001 | Ozawa | G02B 7/346 359/618 |
| 6,765,663 | B2 | 7/2004 | Byren et al. | |
| 8,934,097 | B2 | * 1/2015 | Rushford | G01B 11/272 356/401 |
| 2012/0162757 | A1 | * 6/2012 | Roider | G02B 7/10 359/422 |
| 2013/0314567 | A1 | 11/2013 | McComas et al. | |
| 2014/0300751 | A1 | * 10/2014 | Orband | G01B 11/272 348/184 |
| 2015/0054936 | A1 | * 2/2015 | Bach | G02B 27/646 348/79 |

\* cited by examiner

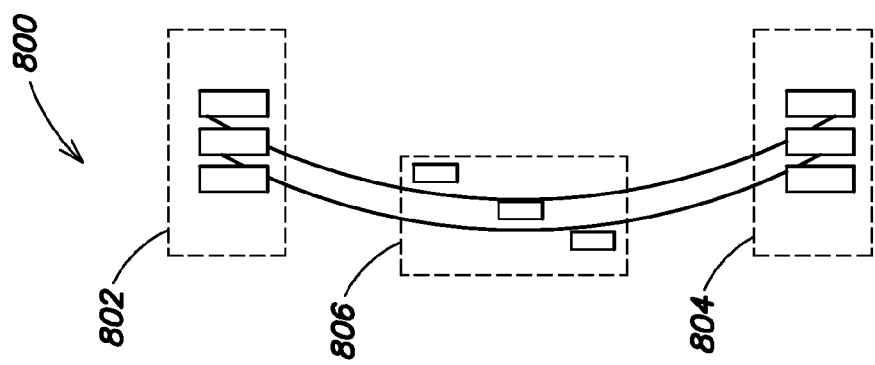
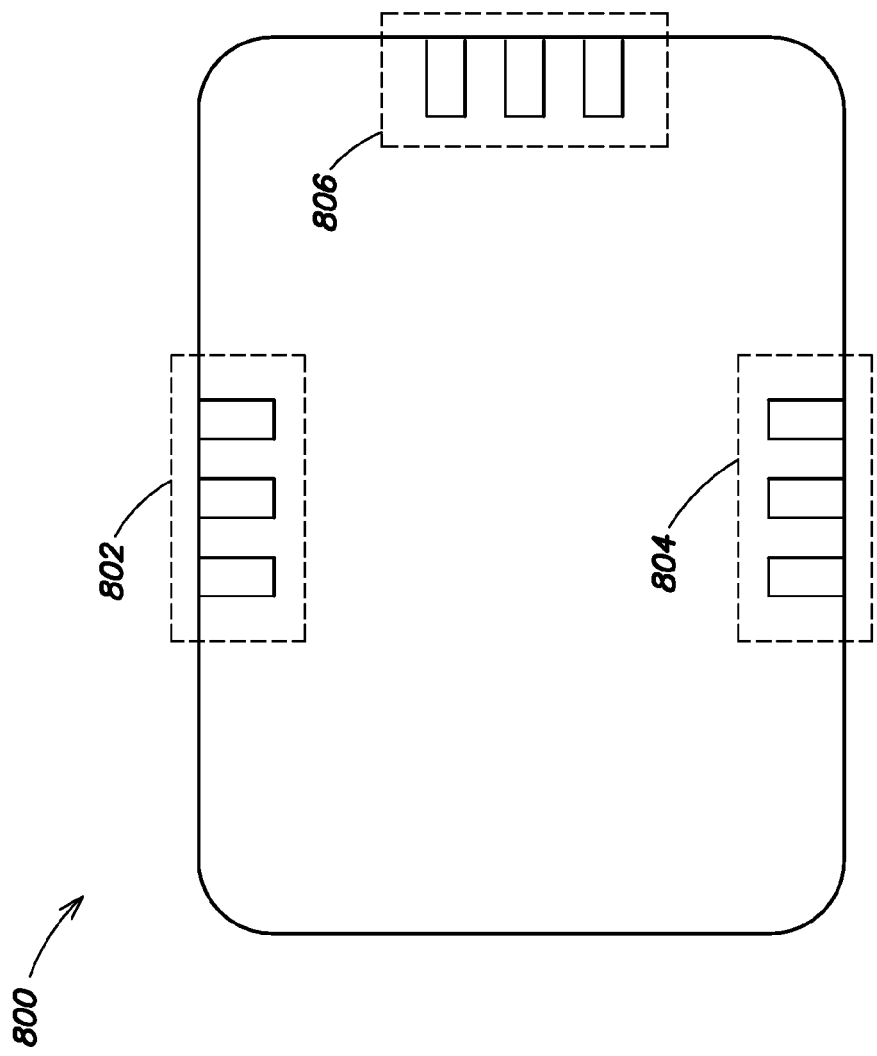

IMAGE PLANE SENSOR ALIGNMENT SYSTEM AND METHOD

BACKGROUND

Electro-optical systems are used in a variety of applications such as imaging, targeting, ranging, tracking, surveillance, and reconnaissance, among other military applications. In many systems, imaging sensors sharing a common image plane produce mutually aligned images of a target or "scene." Mutual alignment of the images ensures accurate alignment of the system components. In particular, various multi-spectral electro-optical systems employ imaging sensors that are receptive to light of different spectral bands, such as infrared thermal imagers and visible color television cameras. Accordingly, multi-spectral electro-optical systems permit an operator to detect and identify target characteristics otherwise concealed in optical systems responsive to light of a single spectral band. Conventionally, boresight misalignments in optical systems have been detected and cured with the use of targeting boards after an initial alignment during manufacture. The alignment tends to drift over time, leading to the need to use targeting boards to periodically adjust the alignment. In such conventional systems, the targeting board is located at a distance from the optical system and illuminated so that it is clearly visible in all sensors. By aligning the sensors with the common targeting board, misalignments in the optical system may be detected and properly addressed.

SUMMARY OF THE INVENTION

Various aspects and embodiments relate to electro-optical systems and, in particular, to reimaging optical systems that include an alignment object selectively positioned at an intermediate image plane of the reimaging optical system and configured to superimpose an alignment tool upon one or more images produced therefrom. Accordingly, various embodiments of the alignment object discussed herein permit rapid and real-time sensor to sensor alignment and thus also sensor to laser alignment.

In particular, and as discussed in more detail below, certain aspects and embodiments are directed to a reimaging optical system that includes one or more imaging sensors positioned at a focal plane to receive electromagnetic radiation and configured to generate an image having the alignment tool superimposed thereon. In one setting, this includes a first imaging sensor configured to produce a first image having the alignment tool superimposed thereon and a second imaging sensor configured to produce a second image having the alignment tool superimposed thereon. One or more system components, such as a controller, may be configured to perform an alignment process for the first imaging sensor and/or the second imaging sensor based at least on a position of the alignment tool in the first and/or second image.

In other particular aspects and embodiments discussed in more detail below, the reimaging optical system may include an optical transmitter (e.g., laser) configured to emit an optical beam to designate a target. The first imaging sensor may be positioned to receive electromagnetic radiation reflected from the target and configured to generate an image of the designated target. One or more system components, such as a controller, may be configured to perform an alignment process for the first imaging sensor to align the optical transmitter with the first imaging sensor based on at least a position of the alignment tool in the first image.

Various embodiments discussed herein permit the correction of misalignments resulting from environmental conditions, thermal fluctuations, vibrational forces, or any other disruptive influences on the optical system during operation. It is appreciated that often these disruptive influences increase, decrease, or continually vary during operation of the optical system. Accordingly, various embodiments discussed herein additionally permit real-time correction of misalignments during operation of the associated optical system to accommodate for multiple and varying disruptive influences. In various embodiments, this may include avoiding the need to disengage with the target to perform sensor to sensor alignment at a targeting board. Among the foregoing, various embodiments may have numerous other advantages, such as the advantages discussed below.

According to one aspect, provided is a reimaging optical system. The reimaging optical system may include reimaging foreoptics positioned to receive and reimage incident electromagnetic radiation to produce an intermediate image plane and output an optical beam of the received incident electromagnetic radiation, an imaging optical apparatus positioned to receive the optical beam and focus the electromagnetic radiation of the optical beam onto a first focal plane, a first imaging sensor positioned at the first focal plane and configured to produce a first image responsive to receiving the electromagnetic radiation of the optical beam, an alignment object selectively positioned at the intermediate image plane and configured to superimpose an alignment tool upon the first image, and a controller coupled to the first imaging sensor and configured to perform an alignment process for the first imaging sensor based on at least a position of the alignment tool in the first image.

In one example, the reimaging foreoptics includes a front objective and a first optical component, wherein the intermediate image plane is interposed between the front objective and the first optical component. In a further example, the front objective includes at least one optical element positioned to focus the electromagnetic radiation onto the intermediate image plane. In a further example, the reimaging foreoptics includes a beam steering mirror configured to aim the electromagnetic radiation to substantially position the alignment tool in a field of view of the first imaging sensor.

In one example, the alignment object is fixed at the intermediate image plane and the alignment process for the first imaging sensor includes pixel substitution. In another example, the alignment object includes a plurality of focus indicators, individual ones of the plurality of focus indicators disposed at varying depths of the intermediate image plane, wherein, the controller is further configured to perform a focus process for the first imaging sensor based on at least a focus of individual ones of the plurality of focus indicators. In a further example, the plurality of focus indicators includes a plurality of discrete protrusions extending from a frame of the alignment object.

In one example, the system further includes a second imaging sensor positioned at a second focal plane and configured to produce a second image responsive to receiving the electromagnetic radiation of the optical beam, wherein the alignment object is further configured to superimpose the alignment tool upon the second image. In a further example, the second imaging sensor may include a plurality of imaging sensors positioned at a plurality of focal planes and configured to produce a plurality of images responsive to receiving the electromagnetic radiation of the optical beam, wherein the alignment object is further configured to superimpose the alignment tool upon the plurality of images. In another example, the controller is further coupled to the second imaging sensor and configured to perform the alignment process for the second imaging sensor based on a position of the alignment tool in the second image and the position of the alignment tool in the first image, wherein the alignment process for the second imaging sensor includes determining an offset between the alignment tool superimposed upon the first image and the alignment tool superimposed upon the second image.

In a further example, the controller may be further configured to align the first image sensor and second image sensor to an optical transmitter responsive to determining an offset between the alignment tool superimposed upon the first image and the alignment tool superimposed upon the second image. In another example, the first imaging sensor is responsive to light in a first spectral band and the second imaging sensor is responsive to light in a second spectral band and the imaging optical apparatus further comprises a dichroic beam splitter positioned to receive the optical beam and partition the electromagnetic radiation of the optical beam to the first imaging sensor and the second imaging sensor based on the first and second spectral bands.

In one example, the alignment tool may include a reticle. In a further example, the reticle includes a grid having a plurality of longitudinal and latitudinal extending delineations defined by a substantially square profile.

In one example, the reimaging foreoptics may include at least one pivot and the alignment object is configured to rotate about the pivot and extend into the intermediate image plane in real-time. In one example, the system further includes at least one illumination source positioned to substantially illuminate the alignment object.

According to one aspect, provided is an optical reimaging method. The method may include receiving and reimaging electromagnetic radiation incident on reimaging foreoptics configured to produce an intermediate image plane and output an optical beam, receiving and focusing the electromagnetic radiation of the optical beam onto a first focal plane, producing a first image with a first imaging sensor positioned at the first focal plane responsive to receiving the electromagnetic radiation of the optical beam, selectively positioning an alignment object having an alignment tool at the intermediate image plane to superimpose the alignment tool upon the first image, and performing an alignment process for the first imaging sensor based on at least a position of the alignment tool in the first image.

In one example, the method may further include aiming the electromagnetic radiation to substantially position the alignment object in a field of view of the first imaging sensor. In another example, the alignment object is fixed at the intermediate image plane and performing the alignment process for the first imaging sensor includes performing pixel substitution.

In one example, the method may further include producing a second image with a second imaging sensor positioned at a second focal plane responsive to receiving the electromagnetic radiation of the optical beam, and wherein selectively positioning an alignment object having an alignment tool at the intermediate image plane includes selectively positioning an alignment object having an alignment tool at the intermediate image plane to superimpose the alignment tool upon the first image and the second image. In a further example, the method further includes performing an alignment process for the second imaging sensor based on a position of the alignment tool in the second image and a position of the alignment tool in the first image. In a further example, the alignment process for the second imaging sensor includes determining an offset between the alignment tool superimposed upon the first image and the alignment tool superimposed upon the second image.

In one example, the method may further include performing a focus process for the first imaging sensor based on at least a focus of individual ones of a plurality of focus indicators of the alignment object positioned at the intermediate image plane. In a further example, the focus process includes repositioning the alignment object at the intermediate image plane responsive to comparing the focuses of individual ones of the plurality of focus indicators. In a further example, the focus process further includes analyzing range information and temperature information. In another example, the method further includes illuminating the alignment object.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIGS. 8A-8B are illustrations of further examples of an alignment object according to aspects of the invention.

DETAILED DESCRIPTION

Figure 1:
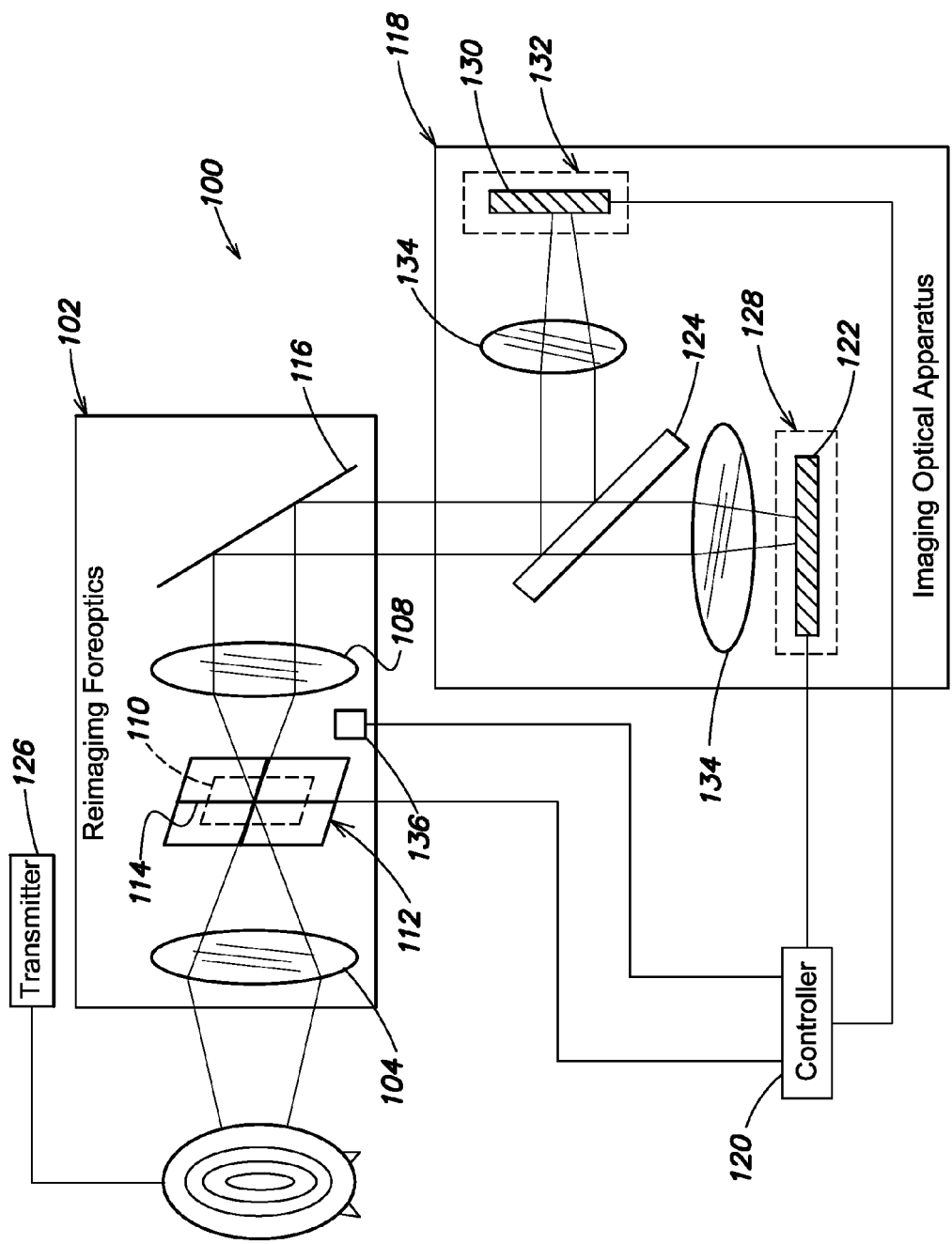
FIG. 1 is a block diagram of one example of a reimaging optical system according to aspects of the invention.

Aspects and embodiments described herein include systems and methods for image plane sensor alignment. In various embodiments this includes systems and methods for real-time correction of sensor to sensor misalignments in a multi-spectral electro-optical system. Electro-optical systems are used in a variety of applications including imaging, targeting, ranging, tracking, surveillance, and reconnaissance, and in particular, are often used in military airborne missions. In these applications, mutually aligned imaging sensors in the optical system are imperative to ensuring the accuracy of the associated system. Even slight misalignments can result in undesirable effects, such as targeting inaccuracy and decreased precision.

As discussed above, there is a need for an optical system configured to correct sensor to laser and sensor to sensor misalignments resulting from environmental conditions, thermal fluctuations, vibrational forces, or any other disruptive influences on the optical system during operation. Conventional alignment techniques generally require special test equipment and a great deal of time to perform. Alternative techniques require field equipment that fails to accommodate operational conditions and invariably requires disengagement with the target to complete alignment. Therefore, such alignment techniques are not practical or efficient during the normal operation of the optical system. Accordingly, various embodiments discussed herein permit real-time alignment of one or more imaging sensors in an optical system without disengaging with the target. Such systems permit continual boresight corrections to accommodate the misalignment of imaging sensors that may occur during airborne military missions.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring to FIG. 1, there is illustrated a block diagram of one embodiment of a reimaging optical system according various aspects discussed herein. As shown, the reimaging optical system 100 includes a reimaging foreoptics 102, a front objective 104, a first optical component 108, an intermediate image plane (indicated as ghost box 110), an alignment object 112 having an alignment tool 114, an optical beam steering mirror 116, an imaging optical apparatus 118, and a controller 120. In one implementation, the reimaging foreoptics 102 includes afocal foreoptics; however, in alternative implementations the reimaging foreoptics 102 are not necessarily afocal. The foreoptics 102 create an intermediate image plane and are common to the imaging sensors in the imaging optical apparatus 118. In various embodiments, the imaging optical apparatus 118 may include one or more imaging sensors (e.g., first imaging sensor 122 and second imaging sensor 130), and imaging optics (shown generally as imaging optics 134), such as one or more mirrors and/or lenses. Additionally, a dichroic beam splitter 124 or other optical element may be used to separate two or more spectral bands for imaging by two or more corresponding imaging sensors, as discussed further below. Various embodiments may also include one or more optical transmitters 126, such as a short-wave infrared laser. The optical transmitter(s) may share foreoptics with the imaging optical apparatus, or include a separate aperture (shown in FIG. 1). While not shown, the reimaging foreoptics 102 and imaging optical apparatus 118 may each include, or share, a housing. The housing surrounds portions of the foreoptics 102 and/or the imaging optical apparatus 118, and protects the optical components therein from dust, dirt, moisture, etc. The optics contained in reimaging foreoptics 102 and imaging optical apparatus 118 may be any combination of reflective, refractive, and dispersive optics. In various embodiments, the optical system shown in FIG. 1 may be used in conjunction with various multi-spectral electro-optical systems.

Incident electromagnetic radiation from a distant target or "scene" is received and manipulated by the reimaging foreoptics 102 so as to produce an image at the intermediate image plane 110 and output an optical beam of the received incident electromagnetic radiation. In various embodiments, electromagnetic radiation received by the reimaging foreoptics 102 enters through the front objective 104 of the reimaging optical system 100. The front objective 104 may include one or more optical elements, such as one or more mirrors or lenses. In one setting, the front objective 104 receives the electromagnetic radiation and focuses the electromagnetic radiation onto the intermediate image plane 110. In various embodiments, the reimaging foreoptics further includes a first optical component 108, such as a mirror or lens. In one implementation, optical components of the reimaging optical system 100, such as the front objective 104 and first optical component 108 are configured to substantially reimage the received electromagnetic radiation to generate an output optical beam. In various embodiments, the reimaging foreoptics 102 direct the optical beam to the imaging optical apparatus 118.

As discussed herein, the intermediate image plane 110 is formed between the front objective 104 and the first optical component 108 of the reimaging foreoptics 102. Notably, the intermediate image plane 110 is upstream from the imaging optical apparatus 118. The intermediate image plane 110 includes the plane at which an image of the target or "scene" is formed. In various embodiments, the reimaging foreoptics 102 may further include one or more optical elements positioned at the intermediate image plane 110 to filter the electromagnetic radiation respective to the angle of incidence at which the electromagnetic radiation is received. Accordingly, positioning the alignment object 112 upstream from the imaging optical apparatus 118 enables the reimaging optical system 100 to rapidly and efficiently insert and remove the alignment object 112 with minimal interference to other system components. As discussed above, and in contrast to many conventional systems, deployment or retraction of the alignment object 112 may occur at any time during operation of the optical system 100. Accordingly, the reimaging optical system 100 may repeatedly perform one or more alignment processes to accommodate for fluctuations in environmental influences.

In various embodiments, the alignment object 112 is defined by a frame and a transparent window having the alignment tool 114 disposed therein. Accordingly, the transparent center of the alignment object permits the received electromagnetic radiation to pass through the alignment object 112 and propagate to the imaging optical apparatus 118 and associated one or more imaging sensors. It is appreciated that this configuration permits the reimaging optical system 100 to remain engaged and in view of the target, despite placement of the alignment object 112 at the intermediate image plane 110. As used herein, the intermediate plane is not defined as a discrete point and may include, for example, the general area around the image plane as defined by geometric optics. Accordingly, in various embodiments positioning the alignment object at the intermediate plane may not restrict the alignment object to the depth of focus of the intermediate image plane.

In one embodiment, the imaging optical apparatus 118 is positioned to receive the optical beam and focus the electromagnetic radiation of the optical beam onto one or more focal planes (e.g., first focal plane 128 and second focal plane 132). One or more imaging sensors are positioned at the one or more focal planes and configured to produce an image of the scene formed at the respective focal plane by the optical beam. In one embodiment, the imaging sensors may include one or more cameras sensitive to electromagnetic radiation of one or more spectral bands. In one example, the imaging sensors may include a detector array, such as a focal plane array comprised of a grid array of pixels organized in rows and columns. For instance, the imaging sensors may include a daytime television (DTV) camera, a SWIR camera, and a MWIR camera. The electromagnetic radiation of the optical beam may include ultraviolet (UV), visible, and/or infrared radiation in one or more of the near infrared (NIR), shortwave infrared (SWIR), midwave infrared (MWIR), longwave infrared (LWIR), and/or very-longwave infrared (VLWIR) spectral bands. As discussed above, the one or more imaging sensors may be configured to produce an image from the received electromagnetic radiation. In various embodiments, the images produced by the one or more imaging sensors are copies of the image formed at the intermediate image plane 110. For example, the first imaging sensor 122 may be positioned at the first focal plane 128 and configured to produce a first image responsive to receiving electromagnetic radiation in a first spectral band. Furthermore, the second imaging sensor 130 may be positioned at the second focal plane 132 and configured to produce a second image responsive to receiving electromagnetic radiation in a second spectral band. As discussed above, the dichroic beamsplitter 124, or other device, may be used to separate and direct the electromagnetic radiation in the different spectral bands to the respective imaging sensors. Alternatively, the first imaging sensor 122 and the second imaging sensor 130 may share the same focal plane. In such an embodiment, the optical system 100 can be configured to switch the imaging sensors based on a wavelength of the electromagnetic radiation received. While shown in FIG. 1 as including a first imaging sensor and a second imaging sensor, in various embodiments the imaging optical apparatus includes a plurality of imaging sensors, individual ones of the plurality configured to produce an image from the received electromagnetic radiation.

In various embodiments, the alignment object 112 may be deployed at the intermediate image plane 110, manually or automatically, to superimpose the alignment tool 114 upon the image formed thereat. Accordingly, the alignment tool 114 will appear superimposed on the images produced by the one or more imaging sensors. The alignment object 112 may also be retracted to remove the alignment tool 114 from the image plane 110. In various embodiments, the controller 120 coupled to the one or more imaging sensors may be configured to perform an alignment process, discussed in more detail below, for the first imaging sensor 122 and/or second imaging sensor 130 based on at least a position of the alignment tool 114 in the first image and/or second image.

Accordingly, the controller may be configured to perform a series of operations, such as an alignment process, responsive to receiving one or more images from the one or more cameras. In various embodiments this may include, displaying the one or more images for external presentation via one or more interfaces, detecting a misalignment, aligning the one or more imaging sensors with the optical transmitter, and/or mutually aligning the one or more imaging sensors, among various other operations. As shown in FIG. 1, the imaging optical apparatus 118 may additionally include one or more mirrors or lenses (e.g., imaging optics 134) positioned to receive or transmit the optical beam. Mirrors or lenses may further be positioned to direct, focus, or otherwise position the optical beam onto the focal plane. The mirrors or lenses of the imaging optical apparatus may also correct chromatic aberrations, spherical aberrations, astigmatisms, or any other undesirable effects of reimaging optical assembly components.

As discussed above, the imaging optical apparatus 118 may further include a dichroic beamsplitter 124 positioned to receive the optical beam and partition the electromagnetic radiation of the optical beam to the one or more imaging sensors (e.g., first imaging sensor 122 and second imaging sensor 130). In further embodiments, the beam splitter may be positioned to partition to the collimated optical beam to the first, the second, and a third imaging sensor of the imaging optical apparatus 118. In various applications, this includes splitting the collimated optical beam as a function of the wavelengths of the electromagnetic radiation received. The collimated optical beam may be split into one or more spectrally distinct partitions of the collimated optical beam. For example, this can include partitioning the collimated optical beam to the DTV camera, the SWIR camera, and the MWIR camera, of one embodiment. Accordingly, images produced by the DTV camera, SWIR camera, and MWIR camera, all provide distinct information regarding the target or scene imaged.

In various embodiments, one or more optical elements of the reimaging foreoptics 102 are in communication with a controller, such as the controller 120, are selectively positioned to aim the received electromagnetic radiation. For example, one or more optical elements of the front objective 104 configured to aim the electromagnetic radiation to substantially align the intermediate image plane at the alignment tool.

In some cases, the alignment tool 114 may require illumination to produce sufficient contrast and visibility in one or more sensors. In such an instance, an illumination source 136 may be placed in the foreoptics 102 outside of the optical path. The illumination source 136 is configured to illuminate the alignment tool 114. Illumination reflected from the alignment tool 114 travels through the optical path to the one or more imaging sensors. At longer wavelengths, such as MWIR and LWIR, the alignment tool 114 is typically glows due to its own temperature. Variations on the use of an illumination source 136 include the use of an alignment tool 114 that produces its own light in the UV through SWIR bands via electrical heating, phosphorescent material, or other similar mechanisms.

Figure 2:
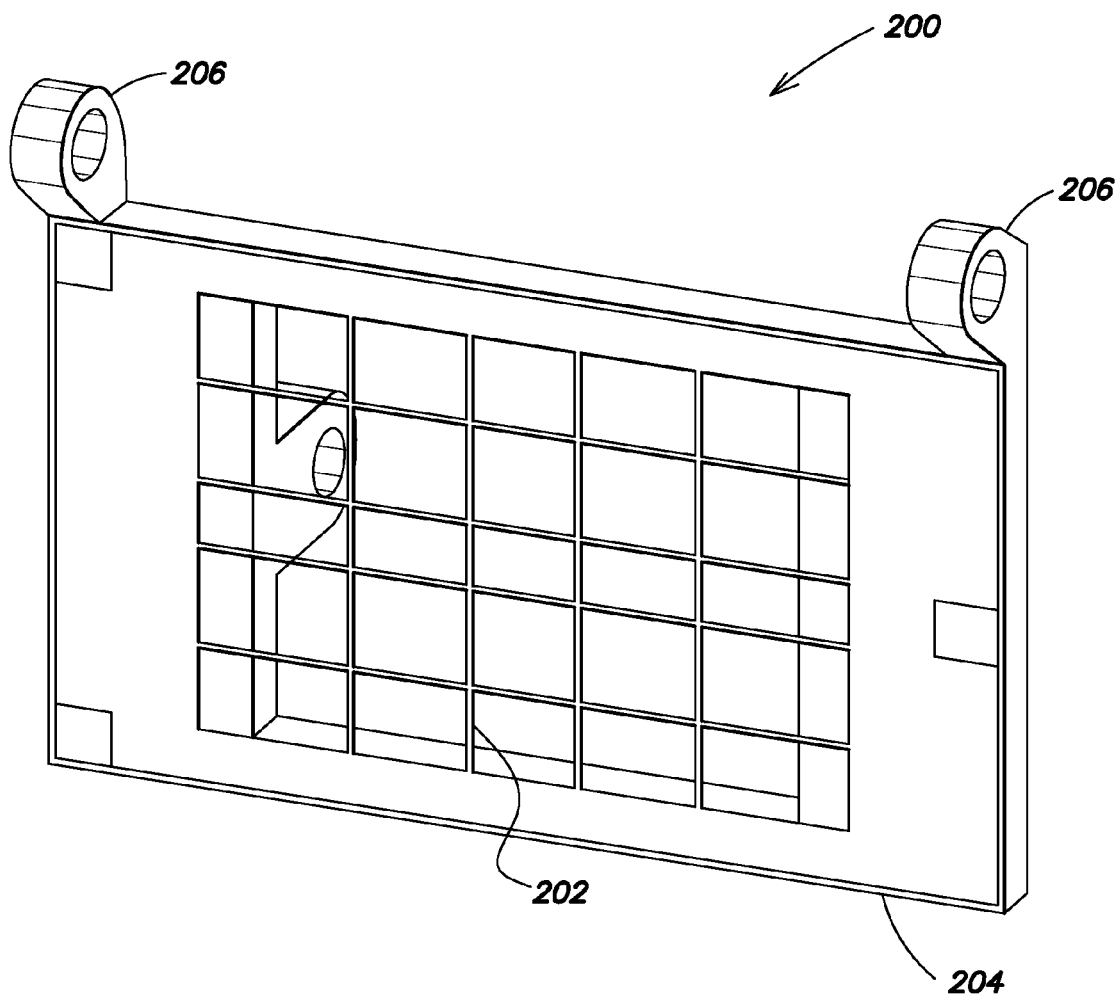
FIG. 2 is an illustration of one example of an alignment object according to aspects of the invention.

Referring to FIG. 2, there is illustrated one example of an alignment object (indicated generally by arrow 200), according to an embodiment. As discussed above, the alignment object 200 may be configured to superimpose an alignment tool 202 upon an image formed at the intermediate image plane (e.g., intermediate image plane 110 of FIG. 1), and accordingly, upon images produced by the one or more imaging sensors (e.g., first imaging sensor 122 and second imaging sensor 130 of FIG. 1). FIG. 2 shows the alignment object 200 including a baffle 204 having an alignment tool 202 including a plurality of longitudinal and latitudinal extending delineations defined by a substantially square profile (e.g., grid). Delineations may include wires having at least one planar surface. While shown in FIG. 2 as a grid, in various other embodiments the alignment tool 202 may include any recticle. Reticles may include cross-hairs, circles, horseshoes, dots, concentric circles, or any other shape suited to assist the optical system in aligning system components and any shape that results in a common alignment feature.

In additional embodiments, the alignment object 200 may include additional alignment tools (e.g., reticles) or filters. In such an embodiment, individual ones of a plurality of alignment tools and/or filters may be selectively deployed or removed from the intermediate image plane. For example, the alignment object 200 may include a rotatable wheel shaped and positioned to allow any one of multiple alignment tools to be placed in the optical path at the intermediate image plane. In one example, each alignment tool may be configured to assist sensor to sensor alignment for a different field of view of the optical system. Accordingly, rotation of the alignment object 200 (e.g., by the controller) may switch between the plurality of alignment tools or filters, and further permit the associated optical system to conform the alignment tool to the particular mission. It is appreciated that this may further increase the precision of alignments. In other embodiments, the alignment object 200 is retained in a fixed position outside of the nominal field of view of the imaging sensors at intermediate image plane. In such a setting, a beam steering mirror may be positioned to receive and aim the electromagnetic radiation to the imaging sensors so as to substantially align the intermediate image plane with the alignment tool 202. In further implementations, the alignment object 200 may include one or more focus indicators. Individual ones of the plurality of focus features are positioned so as to appear at varying depths when the alignment object 200 is positioned at the intermediate image plane. Accordingly, the alignment object may be used to perform a focus process for an associated optical system. Such implementations are discussed in detail below with reference to FIGS. 7-9.

Figure 3C:
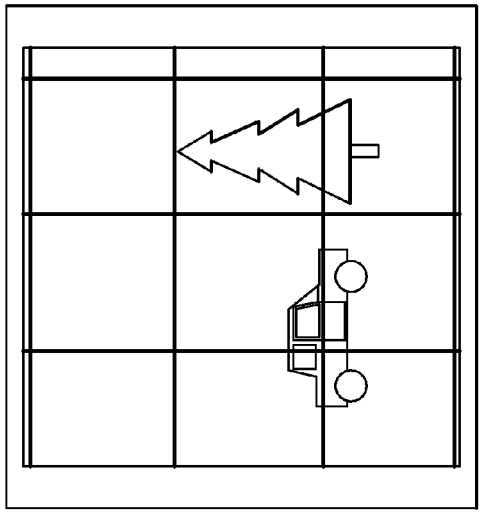
FIGS. 3A-C are example images taken by a reimaging optical system according to aspects of the invention.
Figure 3B:
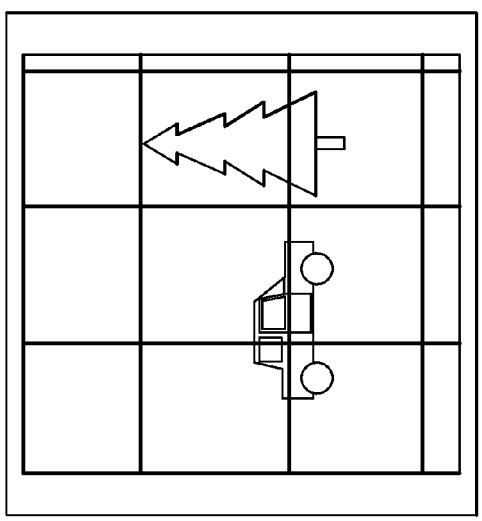
Figure 3A:
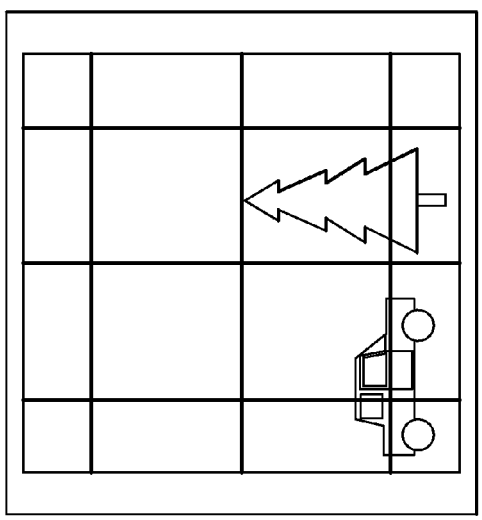

Turning briefly to FIGS. 3A-3C, there are illustrated example images produced by the DTV camera, the SWIR camera, and the MWIR camera, of one embodiment. Each image has the alignment tool superimposed thereon. FIG. 3A shows an image of a target at a first field of view detected with the DTV camera. FIG. 3B shows an image of the target at the first field of view detected with the SWIR camera. FIG. 3C shows an image of the target at the first field of view detected with the MWIR camera. As shown in FIGS. 3A-3B, delineations of the alignment tool may be evenly spaced apart. However, in additional embodiments the one or more delineations of the alignment tool need not be evenly spaced apart.

Figure 4A:
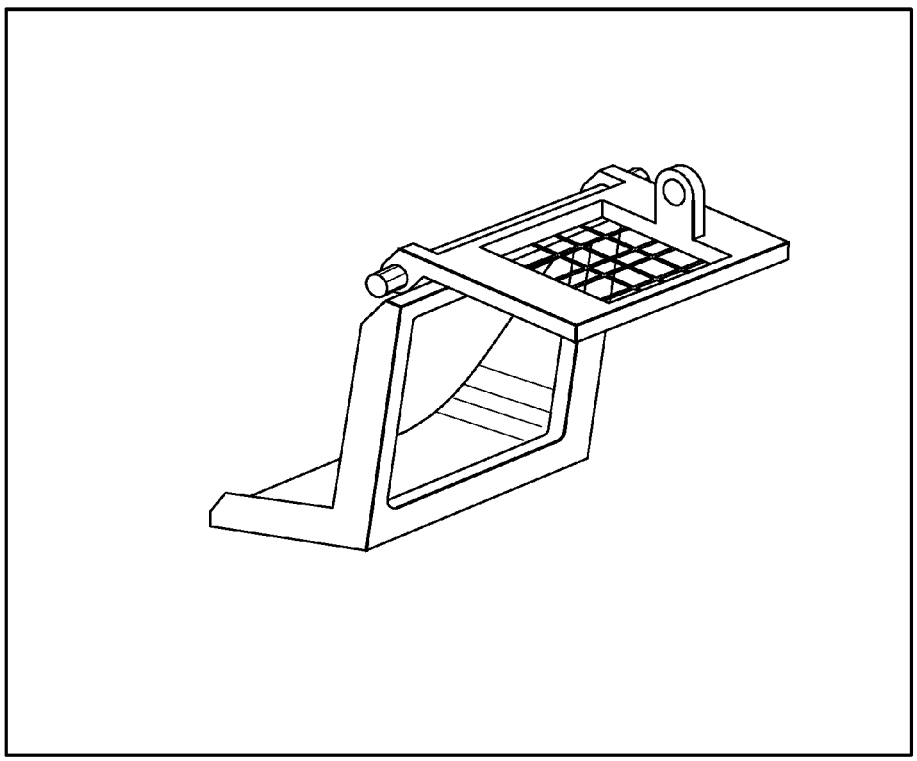
FIG. 4A is an illustration of a retracted alignment object in an example reimaging optical system according to aspects of the invention.
Figure 4B:
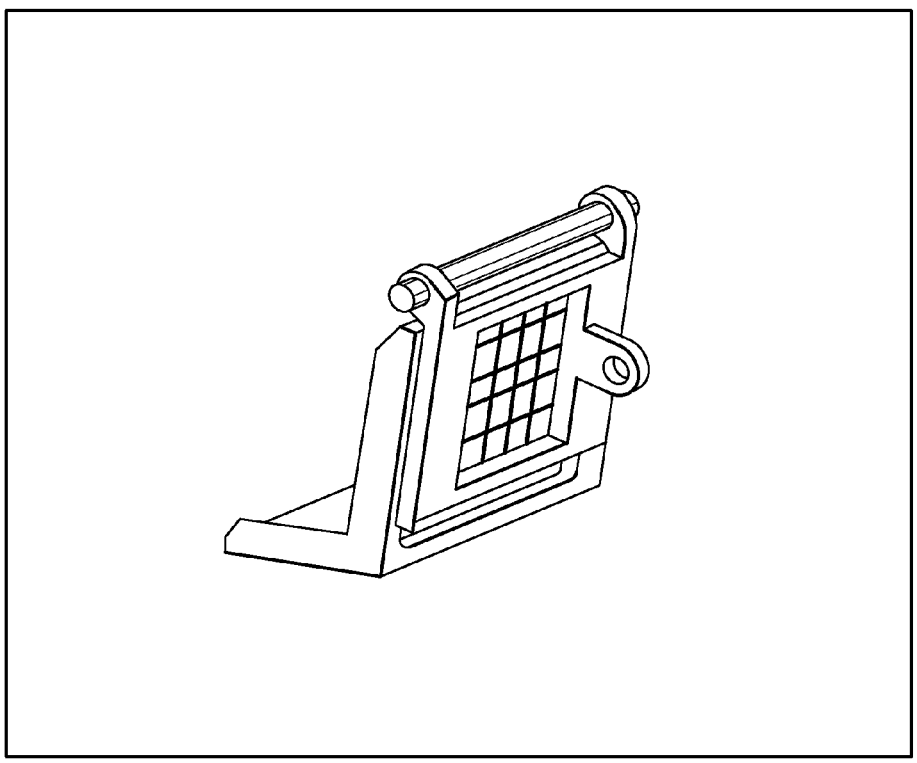
FIG. 4B is an illustration of a deployed alignment object in an example reimaging optical system according to aspects of the invention.

Returning to FIG. 2, in one embodiment the alignment object 200 may include one or more pivot points 206 shaped to rotate about a pivot in the optical system. For example, the pivot may be coupled with or defined by the housing. Rotation about the pivot deploys the alignment object 200 and selectively positions the alignment object 200 at the intermediate image plane. Rotation in a substantially opposite direction retracts the alignment object 200 and selectively removes the alignment object 200 from the intermediate image plane. FIG. 4A depicts an illustration of an alignment object selectively removed from an intermediate alignment plane, and FIG. 4B shows the alignment object selectively positioned at the intermediate image plane.

In various embodiments, such as those discussed with reference to FIGS. 4A and 4B, a controller may be in communication with one or more system components configured to deploy or retract the alignment object. While shown in FIGS. 4A and 4B as rotating about a pivot, in various other embodiments, the alignment object may deploy via an extendable arm, rotate about a wheel, or deploy or retract into the intermediate image plane in any other appropriate manner. In such an embodiment, the controller, such as controller 120 described above, may provide instructions to one or more actuators (e.g., a mechanical motor operated by electrical current, fluid pressure, electromagnetic energy, or pneumatic pressure) configured to mechanically deploy the alignment object.

Figure 5:
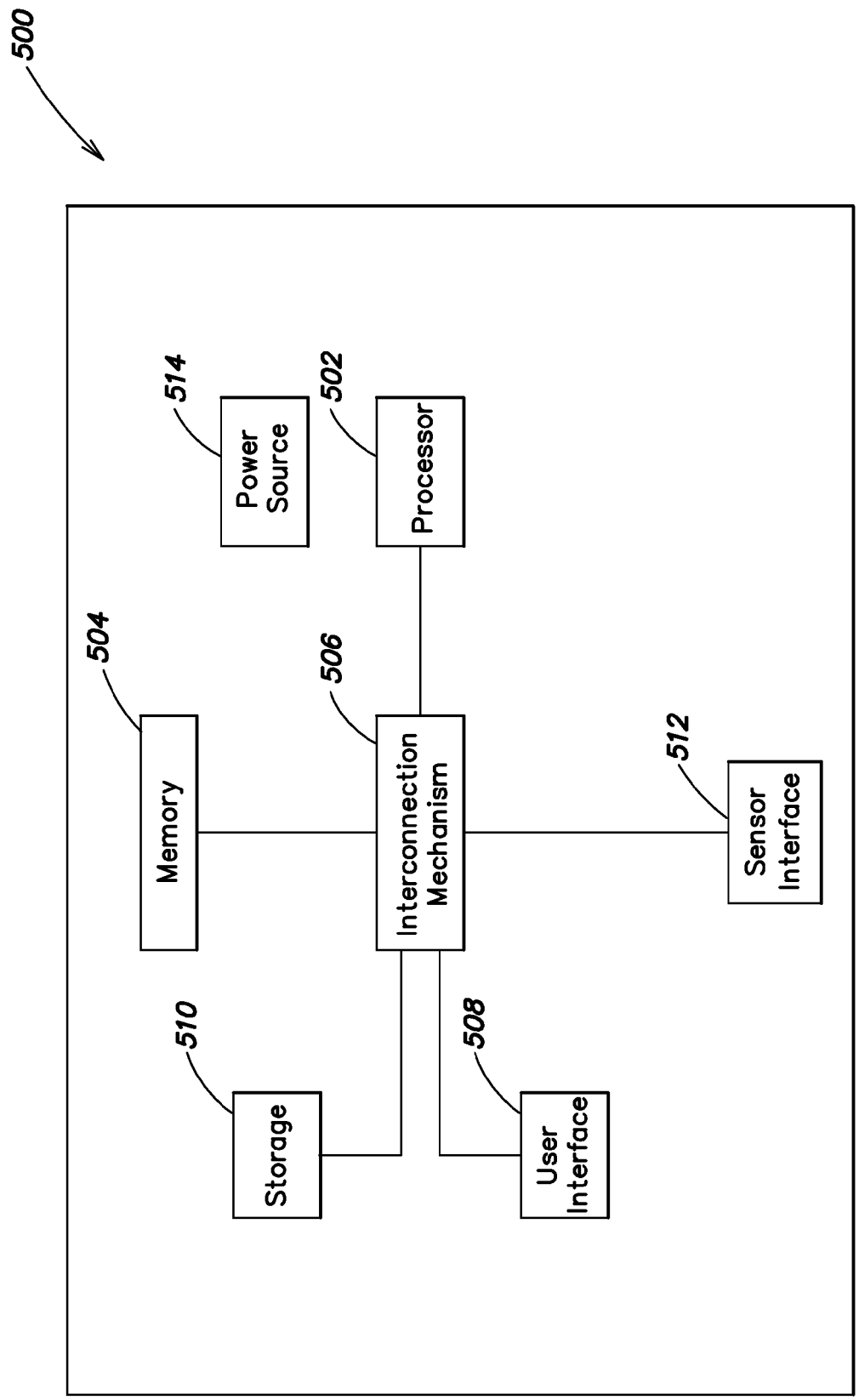
FIG. 5 is an illustration of one example of a controller according to aspects of the invention.

Referring to FIG. 5, there is illustrated a block diagram of an example controller, in which various aspects and functions are practiced. As shown, the controller can include one or more systems components that exchange information. More specifically, the controller 500 can include at least one processor 502, a power source 514, a data storage 510, a sensor interface 512, a user interface 508, a memory 504, and one or more interconnection mechanisms 506. The at least one processor 502 may be any type of processor or multiprocessor. The at least one processor 502 is connected to the other system components, including one or more memory devices 504 by the interconnection mechanism 506. The sensor interface 512 couples one or more sensor, such as the first, second, and/or third imaging sensor, to the at least one processor 502. In various embodiments, the sensor interface 512 can further include any appropriate signal processing circuitry.

The memory 504 stores programs (e.g., sequences of instructions coded to be executable by the processor 502) and data during operation of the controller 500. Thus, the memory 504 may be a relatively high performance, volatile, random access memory such as a dynamic random access memory ("DRAM") or static memory ("SRAM"). However, the memory 504 may include any device for storing data, such as a disk drive or other nonvolatile storage device. Various examples may organize the memory 504 into particularized and, in some cases, unique structures to perform the functions disclosed herein. These data structures may be sized and organized to store values for particular data and types of data.

Components of the controller 500 are coupled by an interconnection mechanism such as the interconnection mechanism 506. The interconnection mechanism 506 may include any communication coupling between system components such as one or more physical busses in conformance with specialized or standard computing bus technologies such as IDE, SCSI, PCI and InfiniBand. The interconnection mechanism 506 enables communications, including instructions and data, to be exchanged between system components of the controller 500.

The controller 500 can also include one or more user interface devices 508 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the controller 500 to exchange information and to communicate with external entities, such as users and other systems.

The data storage element 510 includes a computer readable and writeable data storage medium configured to store noon-transitory instructions and other data, and can include both nonvolatile storage media, such as optical or magnetic disk, ROM or flash memory, as well as volatile memory, such as RAM. The instructions may include executable programs or other code that can be executed by the at least one processor 502 to perform any of the functions described here below.

Although not illustrated in FIG. 5, the controller 500 may include additional components and/or interfaces, such as a communication network interface (wired and/or wireless), and the at least one processor 502 may include a power saving processor arrangement.

Returning to FIG. 1, the controller of various embodiments may also be coupled to the one or more imaging sensors (e.g., imaging sensor 122 and imaging sensor 130) and configured to perform an alignment process for the imaging sensors based on at least a position of the alignment tool 114 in the images produced by the imaging sensors. In various embodiments, this includes the first image produced by the first imaging sensor 122. In various embodiments, the alignment process may include aligning the first sensor 122 with the optical transmitter, or aligning the first imaging sensor 122 with one or more additional imaging sensors (e.g., the second imaging sensor 130 and/or third imaging sensor). Sensor to sensor alignment may include aligning the DTV camera, the SWIR camera, and the MWIR camera, of one embodiment. During sensor to sensor alignment, the controller may be configured to perform a series of image registration algorithms. Image registration includes the process of transforming data of the first image and data of the second or third image into a shared coordinate system. One of the produced images is used as a reference, and the additional images are aligned to match the reference image based on the alignment tools superimposed thereon. For example, in one embodiment, alignment may include determining an offset between the alignment tool 114 superimposed upon the first image, the alignment tool 114 superimposed upon the second image, and the alignment tool 114 superimposed on the third image. Responsive to determining the offset, the controller may align the imaging sensors by adjusting one or more of the optical components of the optical system 100 or linearly translating the associated images. As discussed above, in various embodiments the optical system 100 may include an alignment object 112 fixed at the intermediate image plane 110. In such an embodiment, no reference image is necessary to perform the alignment process. Accordingly, all imaging sensors may be aligned with the fixed alignment object.

In one embodiment, the controller is configured to perform one or more processes to pixel shift the image produced by the first, and/or second, and/or third imaging sensor. Pixel shifting includes moving individual pixels or the entire image frame of the image. While in one embodiment, pixel shifting is performed automatically by the controller, in various other embodiments, the optical system may provide one or more tools, via the interface, permitting the user to manually or automatically mechanically align the imaging sensor(s) or optical transmitter of the optical system 100. Further, the controller can be configured to perform one or more processes to substitute pixels of the image produced by the imaging sensors. Similar to pixel shifting, pixel substitution includes replacing individual pixels of the image. Pixel substitution may be performed automatically by the controller, or via the one or more tools provided to the user.

Although described herein primarily in the context of sensor to sensor alignment (e.g., boresight misalignments), in further embodiments, the alignment object permits measurement and correction of aberrations in the associated optical system. Aberrations can include distortion, rotation, and magnification at each imaging sensor. Various embodiments of an alignment object, such as alignment object 112 discussed above with reference to FIG. 1, support such measurements and corrections. In one implementation, the alignment tool of the alignment object provides several points in the field of view of each imaging sensor from which to measure aberration, rotation, or distortion of an image. In an additional implementation, the alignment object, or a single feature of the alignment object, may be deployed to move across the field of view of each sensor. Accordingly, a reference sensor can be provided to correct the aberration, rotation, or magnification of the imaging sensors. As discussed above, pixel shifting may be applied to each image created by the imaging sensors to correct the distortion, rotation, and magnification, relative to the reference sensor. In other implementations, the alignment tool can be used as an absolute reference removing the need for a reference sensor.

Figure 6:
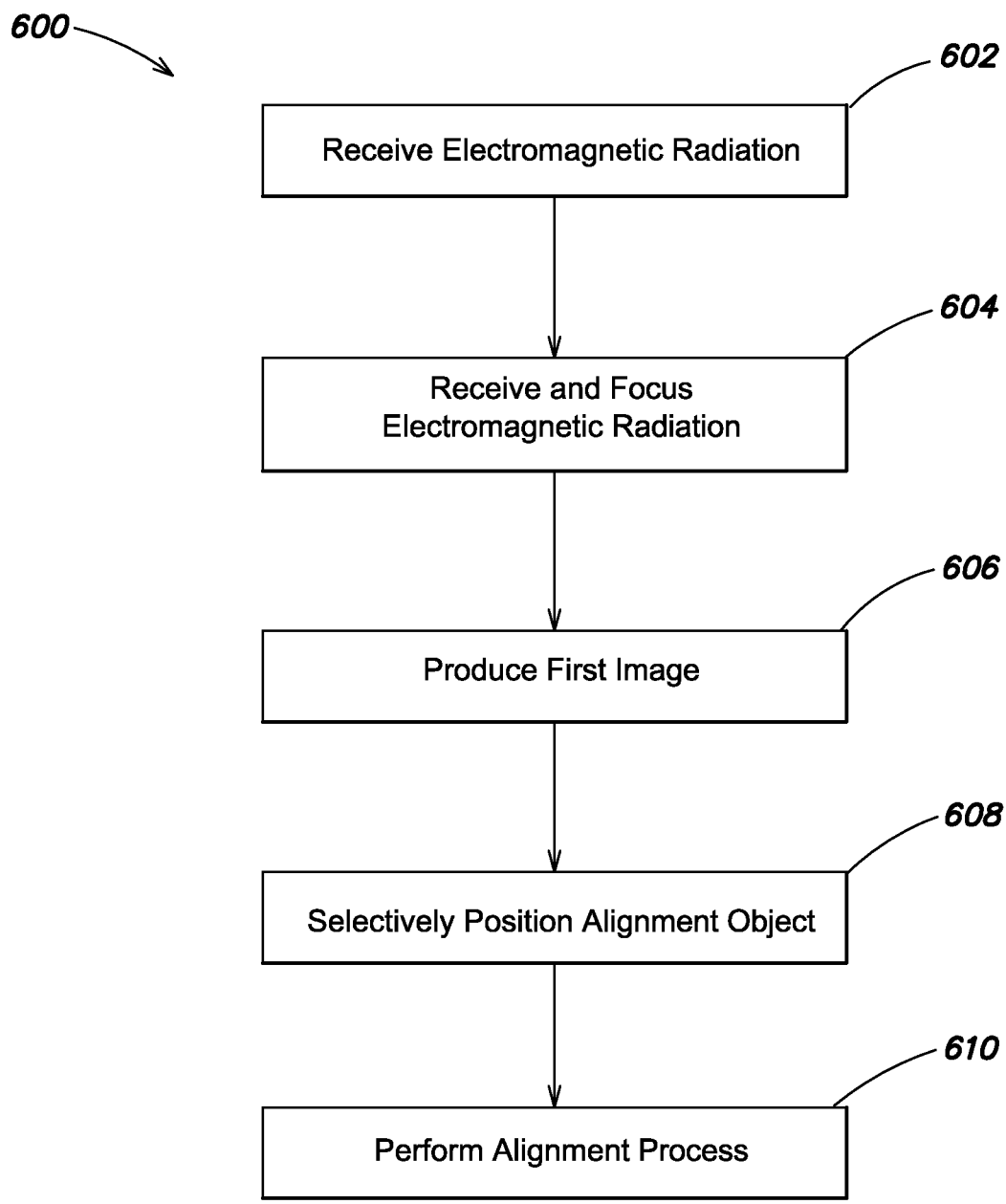
FIG. 6 is a process flow of one example of an optical reimaging method according to aspects of the invention.

As described with reference to FIG. 1, several embodiments perform processes that align one or more sensors in a multi-spectral electro-optical system. In some embodiments, these processes are executed by a reimaging optical system, such as the system described above with reference to FIG. 1. One example of such a process is illustrated in FIG. 6. In act 602, incoming electromagnetic radiation from a distant target or "scene" is received incident on the reimaging foreoptics so as to produce an intermediate image plane. As discussed above with reference to at least FIG. 1, in various embodiments the intermediate image plane may be interposed between a front objective and a first optical component of the reimaging foreoptics.

In act 604, various components of the reimaging optical system receive and image the received incident electromagnetic radiation to the intermediate image plane and output an optical beam of the incident electromagnetic radiation. In one embodiment, the optical beam is directed to an imaging optical apparatus, such as the imaging optical apparatus 118 discussed above with reference to FIG. 1. This may include reflecting the optical beam to one or more beam steering mirrors. In various embodiments, the imaging optical apparatus receives and focuses the electromagnetic radiation of the optical beam onto a focal plane. In further embodiments, the imaging optical apparatus may further include a dichroic beamsplitter positioned to receive the optical beam and partition the optical beam based on one or more spectral bands.

In act 606, a first imaging sensor in the imaging optical apparatus positioned at the focal plane produces a first image responsive to receiving the electromagnetic radiation of the optical beam. In various embodiments, the method may also include producing a second image with a second imaging sensor positioned at the focal plane responsive to receiving the electromagnetic radiation of the optical beam. In further embodiments, the method may include producing a third image with a third imaging sensor, or any additional image with an associated additional imaging sensors. For example, in various embodiments, a DTV camera may produce a DTV image, a SWIR camera may produce a SWIR image, and a MWIR camera may produce a MWIR image.

In act 608, the reimaging optical system selectively positions an alignment object having an alignment tool at the intermediate image plane so as to superimpose the alignment tool upon the first image produced by the first imaging sensor. In various embodiments, selectively positioning the alignment object can include rotating the alignment object about a pivot to extend the alignment object in and out of the intermediate image plane in real-time. In other embodiments, selectively positioning can include aiming the electromagnetic radiation with an optical element, such as a mirror. Accordingly, while in one embodiment positioning the alignment object may include deploying the alignment object at the image plane, in various additional embodiments momentarily positioning the alignment object may include aiming the collimated optical beam to substantially align with the alignment tool of a fixed alignment object. In further embodiments, selectively positioning can include placing the alignment object at a fixed position in the intermediate image plane.

In act 610, a controller, such as controller 120 discussed above with reference to FIG. 1, performs an alignment process for the first imaging sensor based on a position of the alignment tool in the first image. In further embodiments, the controller can perform an alignment process for the second imaging sensor based on a position of the alignment tool in the second image and a position of the alignment tool in the first image. While in one embodiment alignment may include mechanical adjustment of the imaging sensors or optical components of the reimaging optical system, in various other embodiments, the controller may perform a series of image registration algorithms to align the images produced by the one or more imaging sensors. For example, the process may include determining an offset between the alignment tool superimposed upon the first image and the alignment tool superimposed upon the second image.

In various other embodiments, the alignment process may further include a series of algorithms to align the one or more imaging sensors with an optical transmitter. For example, in various embodiments, one or more optical transmitters emit electromagnetic beams out of apertures that are separate from the reimaging foreoptics. These optical transmitter apertures are typically intended to be boresighted to the reimaging foreoptics and imaging optical apparatus. However, various disturbances can cause the optical transmitter aperture to become misaligned from the reimaging foreoptics, such that the optical transmitter can miss a target despite the target being centered in the imaging system. Various embodiments of the imaging optical system and alignment tool can be exploited to achieve laser-to-sensor alignment after sensor-to-sensor alignment has been performed. For example, a target may only be apparent to a particular imaging sensor (e.g., a visible-band detector), while the reflected light of the optical transmitter is visible only to a second imaging sensor (e.g., SWIR detector). Responsive to aligning the imaging sensors, the alignment process can include centering the target in the first imaging sensor (visible-band sensor), and centering the reflected light in the second imaging sensor (SWIR sensor) by manipulating beam steering optics in the optical transmitter aperture. As a result of aligning the imaging sensors, the user can be confident that the reflected light is properly positioned on the target.

In various other embodiments the optical transmitter may share common foreoptics with the imaging optical apparatus. The optical transmitter of the reimaging optical system propagates an electromagnetic beam toward the target. Accordingly, receiving electromagnetic radiation incident on the foreoptics may include collecting radiation from reflection of the electromagnetic beam from the target. As such, in one embodiment a target indicator will appear on the target in the image produced by the one or more imaging sensors (e.g. first and second imaging sensors). As such, the controller may perform an alignment process to substantially center the target indicator in the image produced, based on at least a position of the alignment tool in the image. While in one embodiment alignment may include mechanical adjustment of the sensor or optical transmitter, in various other embodiments, the controller may perform a series of image registration algorithms to center the image produced by the imaging sensor. For example, the process may include determining an offset between the alignment tool superimposed upon the first image and the location of the target indicator on the image.

Figure 7:
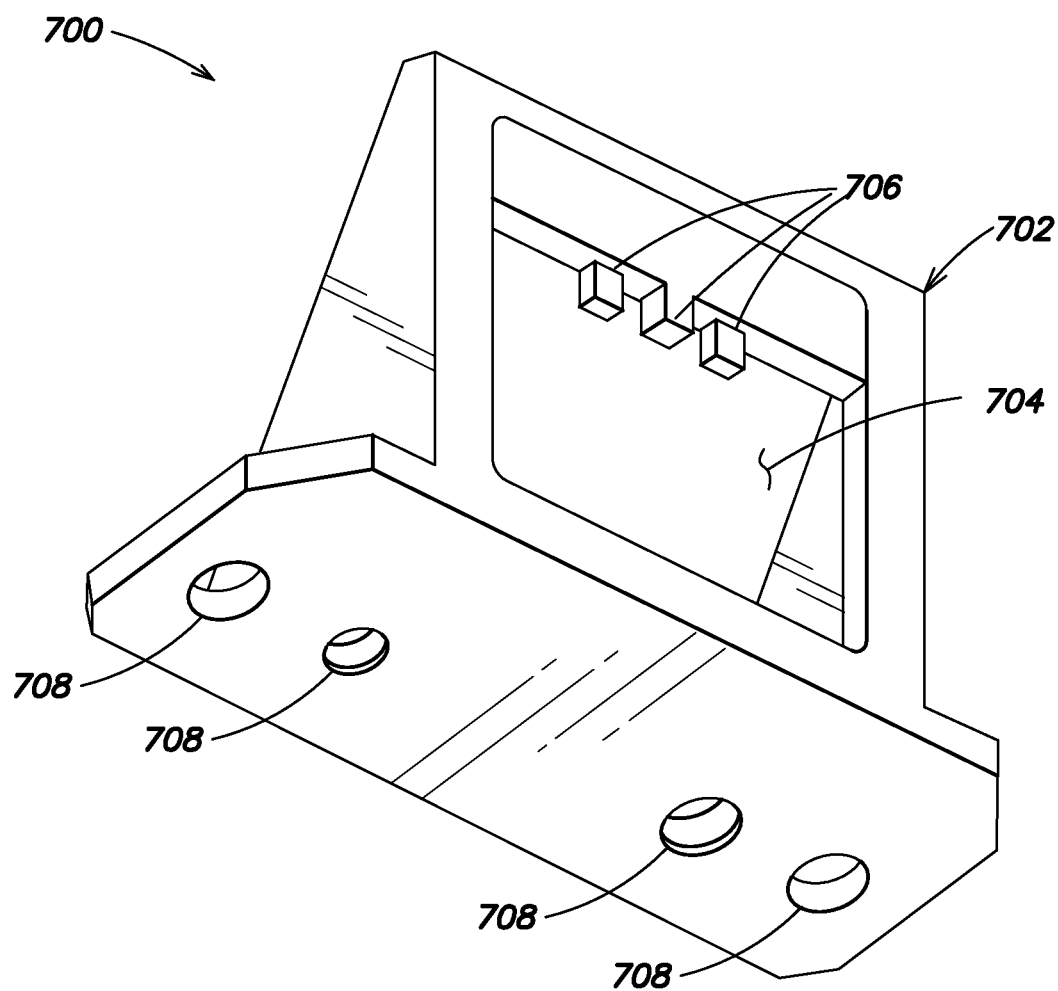
FIG. 7 is an illustration of one example of an alignment object according to aspects of the invention.

Turning now to FIG. 7, and with continuing reference to FIGS. 1 and 2, various embodiments of the optical system 100 may include an alignment object configured to be positioned at the intermediate image plane 110. FIG. 7 shows one example of such an alignment object. In various implementations, the alignment object 700 is defined by a frame 702 having a window 704 through which incident electromagnetic radiation may pass. Such an embodiment is similarly described above with reference to FIG. 2. Accordingly, the transparent center of the alignment object 700 permits the received electromagnetic radiation to pass through the alignment object 700. The electromagnetic radiation may then propagate to the imaging optical apparatus 118 and associated one or more imaging sensors (e.g., imaging sensors 122 and 130). It is appreciated that this configuration permits the reimaging optical system 100 to remain engaged and in view of the target, despite placement of the alignment object 700 at the intermediate image plane 110.

As shown in FIG. 7, in one embodiment the alignment object 700 may include a plurality of focus indicators 706. FIG. 7 shows the plurality of focus indicators 706 as including a series of discrete protrusions extending from the frame 702 of the alignment object 700; however, in further implementations the plurality of focus indicators 706 may include an elongate slope member extending along the length of the alignment object 700. The plurality of focus indicators 706 are positioned within the field of view of the one or more imaging sensors and positioned at varying depths within the intermediate image plane 110 so as to permit an alignment process to be performed by the controller 120. Such a process is described in more detail with reference to FIG. 9 below. Accordingly, focus indicators may include any indicators suitable to indicate a particular focus position and should not be limited solely to the illustrative examples (discrete protrusions and an elongate slope member). In one example, the alignment object 700 may include one or more fastener openings 708 configured to receive one or more fasteners configured to fix the alignment object 700 at the intermediate image plane 110. In other implementations, the alignment object 700 may extend and retract from the intermediate image plane 110 as described above with reference to the alignment object 112. While shown in FIG. 7 as defined by a rigid rectangular frame, in further implementations the alignment object 700 may include further shapes and designs. For example, in one implementation the alignment object 700 may include a non-planar nominal surface. Such an implementation is shown in FIGS. 8A-8B.

FIG. 8A shows a forward facing view of an alignment object according to various implementations. As shown, the alignment object 800 may include a plurality of focus indicators positioned along a frame of the alignment object. For example, the focus indicators shown may include the focus indicators 706 discussed above with reference to FIG. 7. FIG. 8B shows a side facing view of the alignment object 800 according to various implementations. As shown, the focus indicators are positioned at varying depths of an intermediate image plane (e.g., intermediate image plane 110). Accordingly, focus indicators may be positioned at varying offsets about the alignment object 800. For example, FIGS. 8A-8B show a first set of focus indicators 802 positioned at a top portion of the alignment object 800, a second set of focus indicators 804 positioned at a bottom portion of the alignment object 800, and a third set of focus indicators 806 positioned at a side portion of the alignment object 800. While the third set of focus indicators 806 is shown positioned at only one side of the alignment object 800, it is appreciated that the alignment object 800 may include a fourth set of focus indicators positioned at the opposite side of the alignment object 800. As demonstrated in FIG. 8B, each individual focus indicator of the sets of indicators is disposed at an offset within the alignment object, and accordingly, within the intermediate image plane.

While described above as included in an alignment object, in further implementations focus indicators (e.g., focus indicators 706 described with reference to FIG. 7) may be included at a stop or focus structure remote from the alignment object. For example, in one implementation a stop positioned at an intermediate image plane (e.g., intermediate image plane 110) may include a plurality of focus indicators disposed at varying depths of the intermediate image plane, as described herein. In such an implementation, the stop is configured to align with the alignment object at the intermediate image plane. For example, the stop may have one or more planar surfaces configured to receive and couple with the frame of the alignment object of one embodiment.

Figure 9:
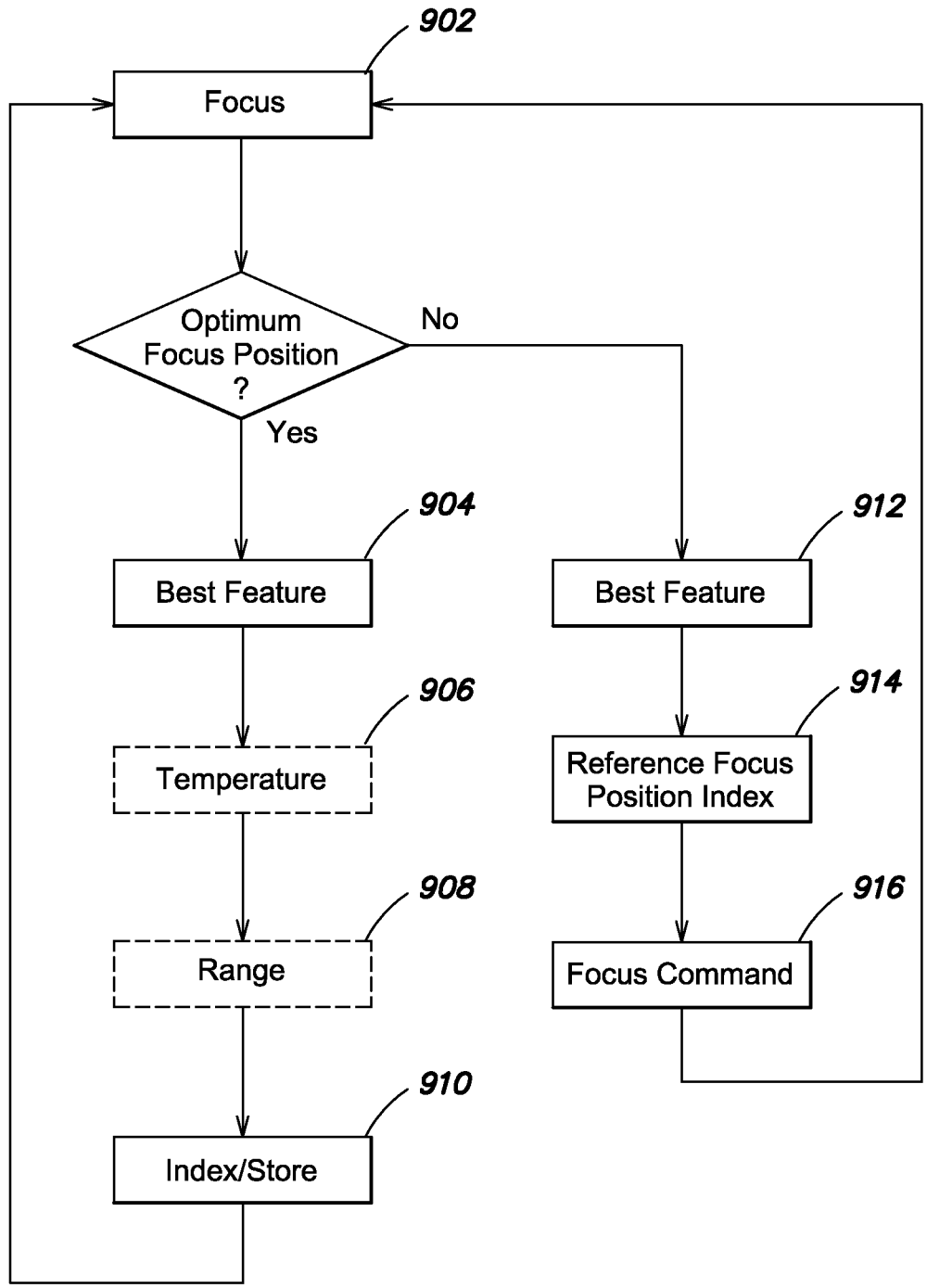
FIG. 9 is a process flow of one example of a focus process according to aspects of the invention.

As described above with reference to FIGS. 1 and 7, several embodiments perform a focus process for the one or more imaging sensors based on at least a focus of individual ones of a plurality of focus indicators within an alignment object. In some embodiments, the process is executed by a controller, such as the controller 120 described above with reference to FIG. 1. One example of such a process is illustrated in FIG. 9. Generally, the controller is configured to employ one or more high-contrast step-response features to determine the optimum focus of the optical system based on a comparison of the focus of individual focus indicators disposed at varying depths in an intermediate image plane of the optical system. The focus of each individual focus indicator within the field of view of the one or more sensors is compared to determine the individual focus indicator having the best focused feature (i.e. "best feature"). As used herein, "best" or "optimum" focus or feature refers to the focus having the clearest, sharpest, or most defined image. Responsive to identifying the best feature, the controller is configured to identify the depth within the intermediate image plane of the individual focus indicator having the best feature and therefore determine the optimum focus position of the optical system. In one embodiment, determining the optimum focus position may include referencing an index of stored focus positions based on the identified best feature.

Components of the optical system, and in particular an alignment object, may be moved to the optimum focus position at the intermediate image plane, accordingly. Furthermore, inclusion of focus indicators within the optical system permits focal alignments in restricted light environments or prior to transmission of an optical beam by an associated optical transmitter.

In act 902, one or more components of the controller are configured to focus on a target or "scene" imaged by the associated optical system. In various embodiments, act 902 may include an active, passive, or combination of active and passive, autofocus act. It is appreciated that when ambient conditions are ideal (e.g., proper illumination is present, climate conditions are temperate, vibrational influences are minimal, etc.), act 902 may result in an optimal focus of the target and, accordingly, the optimum focus position of the optical system. If the initial focus of act 902 results in an optimum focus position for the optical system, one or more components of the controller are configured to compare the focus of the individual focus indicators to identify the focus indicator having the best feature, as described above. Accordingly, the best feature is identified and associated with the resulting optimum focus position. Such a process is shown in act 904.

In further embodiments, one or more components of the controller are configured to further detect operational diagnostics of the optical system responsive to achieving the optimum focus position. In acts 906 and 908, range information and temperature information are detected responsive to performing the initial focus act 902. It is appreciated that in various embodiments range and temperature may have an effect on the optimum focus position of the optical system. As used herein, temperature information may include ambient temperatures internal or external to the optical system and range information may include the distance to a target imaged by the one or more imaging sensors of the optical system. While shown in act 906 and 908 as detecting range information and temperature information, in further embodiments, other diagnostics may be determined responsive to act 902. For example, the system may include one or more accelerometers, or other vibrational sensors, configured to detect vibrational forcers.

Responsive to receiving the range information, temperature information, and/or identification of the best focused feature, the controller can be configured to store the optimum focus position indexed by the best focused feature, range information, and/or temperature information. For instance, the best feature, range information, or temperature information may be stored in a look-up table. As discussed in further detail with regards to acts 912-916, storage of optimum focus positions indexed by the best focused feature, temperature information, and/or range information permits the optical system to determine an optimum focus position when autofocus is not possible, or, operating conditions prevent focusing on the target as described above in act 902.

In act 912, responsive to failing to determine the optimum focus position of the optical system based on a focus of the target, one or more components of the optical system are configured to determine the best focused feature, temperature information, and/or range information, as described above with reference to acts 904-908. The determined best feature, temperature information, and/or range information, is then used to query one or more databases of stored optimum focus positions to determine the optimum focus position corresponding to the determined best feature, temperature information, and/or range information. While shown in FIG. 9 as including the act of referencing an index to determine the optimum focus position, in various embodiments, the controller may perform a series of steps or algorithms based on the determined best feature, temperature information, and/or range information, to determine the optimum focus position.

In response to determining the optimum focus position from the index or through calculation, the controller is configured to issue a focus command. In act 910, the focus command is issued by the controller to one or more components of the optical system. For example, in response to determining the optimum focus position the controller is configured to issue a command to re-position the alignment object of one embodiment. In such an embodiment, the alignment object may be repositioned at the optimum focus position such that the alignment tool superimposed upon the first image produced by the first imaging sensor is in focus. As described herein, the focus process eliminates the need to manually change the focus of an optical system in order to perform sensor to sensor alignments, in addition to increasing efficiency and reducing boresight shift.

As shown in FIG. 9, the acts described above may be performed continually or at predetermined intervals. Accordingly, an operator of the optical system may specify the frequency at which the focus process described with reference to FIG. 9 is performed.

As is understood, electro-optical systems are used in a variety of applications including imaging, targeting, ranging, tracking, surveillance, and reconnaissance applications, and in particular, are often used in military airborne missions. In such applications, mutually aligned images produced by a variety of sensors all sharing a common image plane in the optical system is imperative to ensuring accurate and precise execution of the corresponding mission. Even slight misalignments can result in undesirable effects, such as targeting inaccuracy and decreased precision. Accordingly, various embodiments discussed herein provide systems and methods for real-time correction of laser to sensor and/or sensor to sensor misalignments in a multi-spectral electro-optical system.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A reimaging optical system comprising:
reimaging foreoptics positioned to receive and reimage incident electromagnetic radiation to produce an intermediate image plane and output an optical beam of the received incident electromagnetic radiation;
an imaging optical apparatus positioned to receive and focus the optical beam onto a first focal plane;
a first imaging sensor positioned at the first focal plane and configured to produce a first image responsive to receiving the optical beam;
an alignment object selectively positioned at the intermediate image plane and configured to superimpose an alignment tool upon the first image; and
a controller coupled to the first imaging sensor and configured to perform an alignment process for the first imaging sensor based on at least a position of the alignment tool in the first image.

2. The system according to claim 1, wherein the reimaging foreoptics comprises a front objective and a first optical component, and wherein the intermediate image plane is interposed between the front objective and the first optical component.

3. The system according to claim 2, wherein the front objective comprises at least one optical element positioned to focus the electromagnetic radiation onto the intermediate image plane.

4. The system according to claim 3, wherein the reimaging foreoptics comprises a beam steering mirror configured to aim the electromagnetic radiation to substantially position the alignment tool in a field of view of the first imaging sensor.

5. The system according to claim 1, wherein the alignment object is fixed at the intermediate image plane and the alignment process for the first imaging sensor includes pixel substitution.

6. The system according to claim 1, wherein the alignment object includes a plurality of focus indicators, individual ones of the plurality of focus indicators disposed at varying depths of the intermediate image plane;
wherein, the controller is further configured to perform a focus process for the first imaging sensor based on at least a focus of individual ones of the plurality of focus indicators.

7. The system according to claim 6, wherein the plurality of focus indicators includes a plurality of discrete protrusions extending from a frame of the alignment object.

8. The system according to claim 1, further comprising a second imaging sensor positioned at a second focal plane and configured to produce a second image responsive to receiving the optical beam, wherein the alignment object is further configured to superimpose the alignment tool upon the second image.

9. The system according to claim 8, wherein the second imaging sensor includes a plurality of imaging sensors positioned at a plurality of focal planes and configured to produce a plurality of images responsive to receiving the optical beam, wherein the alignment object is further configured to superimpose the alignment tool upon the plurality of images.

10. The system according to claim 8, wherein the controller is further coupled to the second imaging sensor and configured to perform the alignment process for the second imaging sensor based on a position of the alignment tool in the second image and the position of the alignment tool in the first image, wherein the alignment process for the second imaging sensor includes determining an offset between the alignment tool superimposed upon the first image and the alignment tool superimposed upon the second image.

11. The system according to claim 10, wherein the controller is further configured to align the first imaging sensor and second imaging sensor to an optical transmitter responsive to determining an offset between the alignment tool superimposed upon the first image and the alignment tool superimposed upon the second image.

12. The system according to claim 10, wherein the first imaging sensor is responsive to light in a first spectral band and the second imaging sensor is responsive to light in a second spectral band, and the imaging optical apparatus further comprises a dichroic beam splitter positioned to receive the optical beam and partition the electromagnetic radiation of the optical beam to the first imaging sensor and the second imaging sensor based on the first and second spectral bands.

13. The system according to claim 1, wherein the alignment tool includes a reticle.

14. The system according to claim 13, wherein the reticle includes a grid having a plurality of longitudinal and latitudinal extending delineations defined by a substantially square profile.

15. The system according to claim 1, wherein the reimaging foreoptics further comprises at least one pivot and the alignment object is configured to rotate about the pivot and extend into the intermediate image plane in real-time.

16. The system according to claim 1, further comprising at least one illumination source positioned to substantially illuminate the alignment object.

17. An optical alignment method comprising:
receiving and reimaging electromagnetic radiation incident on reimaging foreoptics configured to produce an intermediate image plane and output an optical beam;
receiving and focusing the electromagnetic radiation of the optical beam onto a first focal plane;
producing a first image with a first imaging sensor positioned at the first focal plane responsive to receiving the electromagnetic radiation of the optical beam;
selectively positioning an alignment object having an alignment tool at the intermediate image plane to superimpose the alignment tool upon the first image; and
performing an alignment process for the first imaging sensor based on at least a position of the alignment tool in the first image.

18. The method according to claim 17, further comprising aiming the electromagnetic radiation to substantially position the alignment object in a field of view of the first imaging sensor.

19. The method according to claim 17, wherein the alignment object is fixed at the intermediate image plane and performing the alignment process for the first imaging sensor includes performing pixel substitution.

20. The method according to claim 17, further comprising producing a second image with a second imaging sensor positioned at a second focal plane responsive to receiving the electromagnetic radiation of the optical beam, and wherein selectively positioning an alignment object having an alignment tool at the intermediate image plane includes selectively positioning an alignment object having an alignment tool at the intermediate image plane to superimpose the alignment tool upon the first image and the second image.

21. The method according to claim 20, further comprising performing an alignment process for the second imaging sensor based on a position of the alignment tool in the second image and a position of the alignment tool in the first image.

22. The method according to claim 21, wherein the alignment process for the second imaging sensor includes determining an offset between the alignment tool superimposed upon the first image and the alignment tool superimposed upon the second image.

23. The method according to claim 17, further comprising performing a focus process for the first imaging sensor based on at least a focus of individual ones of a plurality of focus indicators of the alignment object positioned at the intermediate image plane.

24. The method according to claim 23, wherein the focus process includes repositioning the alignment object at the intermediate image plane responsive to comparing the focuses of individual ones of the plurality of focus indicators.

25. The method according to claim 24, wherein the focus process further includes analyzing range information and temperature information.

26. The method according to claim 17, further comprising illuminating the alignment object.

* * * * *